Patented May 9, 1939

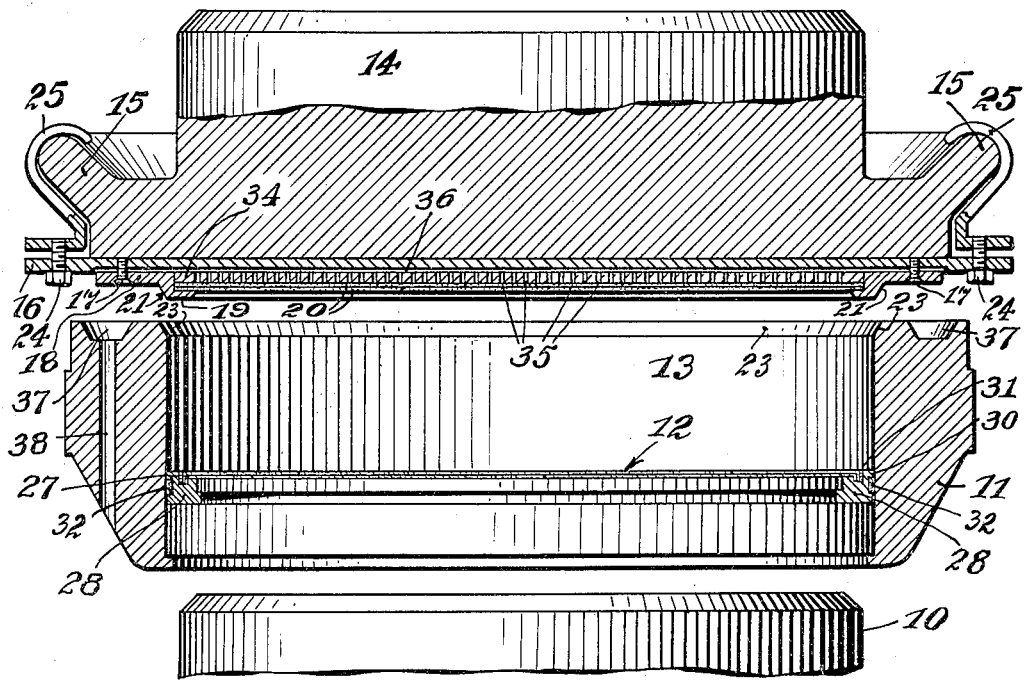
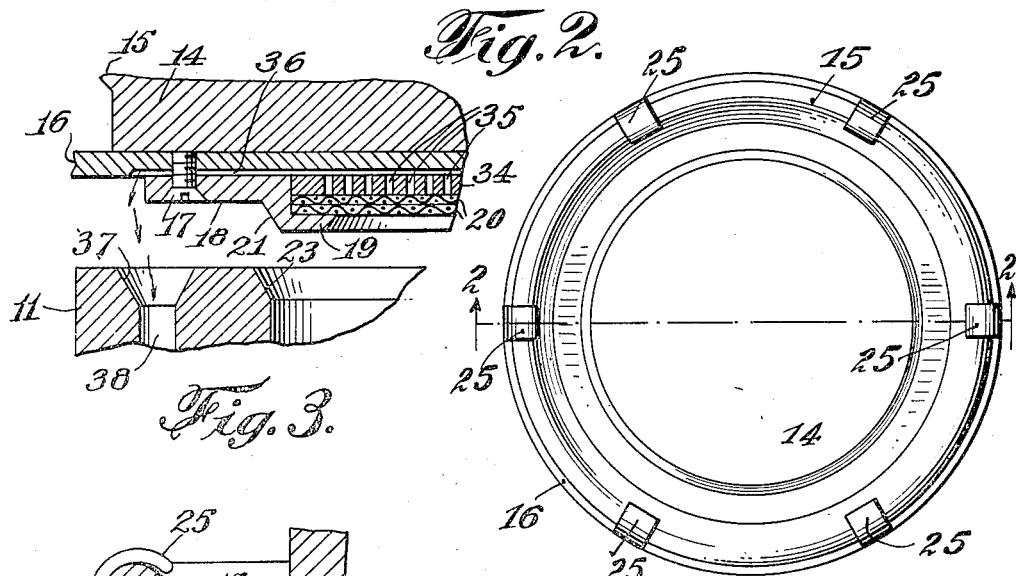
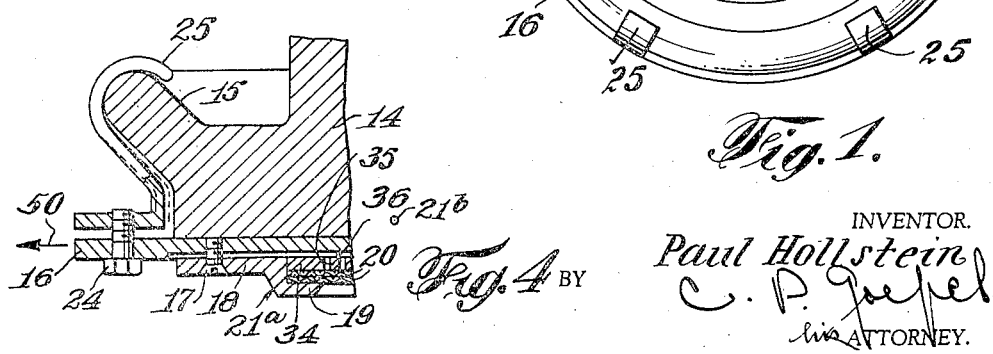

2,157,539

UNITED STATES PATENT OFFICE 2,157,539

HYDRAULIC PRESS

Paul Hellstein, Carlstadt, N. J., assignor to J. M. Lehmann Company, Inc., New York, N. Y., a corporation of New York Application December 20, 1935, Serial No. 55,342

2 Claims. (Cl. 100—54)

This invention relates to hydraulic presses and more particularly to an improvement in the means of closing the pots containing the material under pressure, when the material is liquid or semi-liquid, so as to prevent leakage. This invention is applicable principally to presses for the extraction of cocoa butter from liquid cocoa which must be confined in an open pot, closed with a cover plate and held tight by auxiliary pressure against the pressure of the ram.

The object of the invention is to provide a more effective means of preventing leakage by so constructing the parts as to provide a substantially conical seal between the pot and the closing plate wherein the top plate is loose and is permitted to adjust itself to the pot for proper closure.

An additional improvement consists in the setting of the filter material on the inside face of the pot piston, and adjustably holding it in position to enable the filter material to enter the pot.

The new invention will be hereafter further described, an embodiment thereof being shown in the drawing, and it will be finally pointed out in the claims.

In the accompanying drawing—

Figure 1 is a plan view of the pressure head;

Figure 2 is a central section of the pressure head and pot taken on the line 2—2 of Fig. 1;

Figure 3 is a detail enlarged view of parts of Figure 1;

Figure 4 is a central section of the pressure head taken on line 2—2 of Fig. 1, and having the parts transposed in respect to those shown in Fig. 2.

Similar letters of reference indicate corresponding parts throughout the various views.

Referring to the drawing, the presser member 10 is suitably reciprocated vertically by means well known and not shown in the drawing. This member 10 fits into the liquid pot 11, which has a filter layer 12, which is movable within the bore 13 of the pot 12. Above the pot 11 is a pressure head 14 which has a circumferential rim 15. This pressure head 14 is also operated on by means well known, not herein shown or described.

At the lower surface of the pressure head 14 is a plate 16, to which is secured by bolts 17 or the like, a filter material holder 18, having a circumferential flange 19 to hold a filter material 20.

Disposed adjacent the flange 19 on the holder is a conical wall 21. This conical wall 21 may depart from the straight line and be curved convexly with a large radius of curvature.

In Figure 4 is shown the transposed position of the plate. This is possible because the hook-like members 25 have some resiliency and are movable from the dotted position in Fig. 4 to the full-line position. The dotted line position corresponds to the position of the part 25 in Fig. 2. The full-line position in Fig. 4 corresponds to the transposed position of the part 25. If, then, the plate 16 be moved in the direction of the arrow 50 it will move the bracket 25 from the dotted to full-line position. In consequence the curved portion 21a which has a center of curvature 21b, may adjust itself to the portion 23 of the member 11.

This wall 23 is of substantially conical shape to register with the conical entrance member 21. These walls 21 and 23 being of generally conical shape, permit the entrance portion 21 to readily enter and by reason of their shapes, they will gradually adjust themselves in respect to each other, and finally make a good fit. This automatic adjustment results from the fact that the plate 16 is supported by bolts 24 fastened to the hook-like members 25, which hang on and over the rim 15 of the pressure head 14. Thereby the conical shaped part 21 can move until it fits into the conical shaped part 23.

As shown in Figure 1, there are six of these hook-shaped members 25.

The other filter material 12 has its circumferential ends inserted into a vertical recess 27 in a ring 28, the filter material being bent over to readily enter into the recess.

The ring 28, at its exterior periphery, has a diameter equal or substantially equal to that of the diameter of the bore of the pot 13, at one part of its circumference. This part is shown by 30. Below this part 30, the ring is provided with a circumferential cut out 31, in which is placed a lubricant holding member 32.

It will have been noted that the exact nature of the improvement described consists in the substantially conical shaped part of the top plate which fits into the conical recess of the pot, and forms an efficient closing seat, aided by the hooks which serve to hang the plate loosely in order to enable the closing seats to find themselves when seating.

The plate 34 has openings 35 passing therethrough. The plate 16 has grooves 36. The fluid passes through these openings 35 into the grooves 36, and flows into the funnel-shaped orifice 37 of the channel 38. The grooves 36 may be radial, and are so arranged as to act as conduits for the fluid passing through the openings 36. The openings 35 may be radially arranged.

This arrangement of grooves and openings is well known and forms no part of this invention.

The improvement in the setting of the filter material in the form of the pot piston is in providing a method of fastening said filter without the use of holding rings fastened through the filter material by screws or similar means. The clamping heretofore used does not maintain a flat surface across the entire surface of the pot piston, and also induces a breaking off of light pressed material, when lifting from the filter plate after the cake has been ejected. With the improvement described, the cake can be removed easily, and without breakage by simply sliding the cake off the pot piston. This improvement also permits the pressed cakes to be slid off the filter plate by mechanical means without the necessity of lifting same over obstructing rings or clamps.

My invention has been illustrated and described with some degree of particularity, but it is understood that changes may be made in the form of details and in the construction and arrangement of parts without departing from the spirit and scope of the invention or the scope of the appended claims.

I claim:

1. In a hydraulic press for liquid cocoa butter or the like, having a pressure head with a substantially flat under surface for the pressing action, a flat layer of filter material arranged substantially parallel with the flat under surface of the pressure head, and transversely movable on said pressure head, and a pot having a bore, the combination therewith of means connected with said filter material for supporting the same, hook-shaped devices connected with said supporting means, and a rim on said pressure head engaged by said hook-shaped devices, to permit an adjusting movement of said layer of filter material in a direction parallel with the under surface of the pressure head, said adjustable layer of filter material being freely movable on the pressure head to enable it to be inserted into the adjacent pot when the pot approaches the pressure head.

2. In a hydraulic press for liquid cocoa butter or the like, having a pressure head, a layer of filter material, and a pot having a bore, the combination of a support for the filter material having a conically-shaped surface adapted to enter the bore of the pot, said pot bore having a conically-shaped portion adapted to cooperate with the conically-shaped surface of the pressure head, a rim on said pressure head, and hook-shaped members engaging the rim and connected with said filter support, whereby, upon the layer of filter material entering the pot, said conically-shaped surface and bore adjusts the filter material in proper operative position.

PAUL HOLLSTEIN.